United States Patent
Umayahara

(10) Patent No.: US 9,188,713 B2
(45) Date of Patent: Nov. 17, 2015

(54) LIGHT REFLECTIVE SUBSTRATE AND LIGHT EMITTING DEVICE USING THE SAME

(75) Inventor: Yoshio Umayahara, Otsu (JP)

(73) Assignee: NIPPON ELECTRIC GLASS CO., LTD., Otsu-shi, Shiga (JP)

( * ) Notice: Subject to any disclaimer, the term of this patent is extended or adjusted under 35 U.S.C. 154(b) by 506 days.

(21) Appl. No.: 13/580,393

(22) PCT Filed: Feb. 22, 2011

(86) PCT No.: PCT/JP2011/053847
§ 371 (c)(1),
(2), (4) Date: Aug. 22, 2012

(87) PCT Pub. No.: WO2011/105372
PCT Pub. Date: Sep. 1, 2011

(65) Prior Publication Data
US 2012/0319060 A1    Dec. 20, 2012

(30) Foreign Application Priority Data

Feb. 26, 2010 (JP) .................. 2010-041461
Feb. 14, 2011 (JP) .................. 2011-028031

(51) Int. Cl.
| | |
|---|---|
| F21V 9/00 | (2015.01) |
| G02B 5/02 | (2006.01) |
| G02C 7/10 | (2006.01) |
| G02F 1/361 | (2006.01) |
| G03B 11/00 | (2006.01) |
| C03C 14/00 | (2006.01) |
| G02B 5/08 | (2006.01) |
| F21V 7/22 | (2006.01) |

(52) U.S. Cl.
CPC ........... *G02B 5/0284* (2013.01); *C03C 14/004* (2013.01); *G02B 5/0242* (2013.01); *C03C 2214/04* (2013.01); *F21V 7/22* (2013.01)

(58) Field of Classification Search
USPC ........ 252/582; 359/838; 501/5, 10, 72, 73, 51
See application file for complete search history.

(56) References Cited

U.S. PATENT DOCUMENTS

| | | |
|---|---|---|
| 3,114,066 A | 12/1963 | Allen et al. |
| 2004/0018933 A1 | 1/2004 | Ogino et al. |

FOREIGN PATENT DOCUMENTS

| | | | | |
|---|---|---|---|---|
| CN | 101107202 A | 1/2008 | | |
| JP | B-1966004990 | 3/1966 | | |
| JP | A-2004-292301 | 10/2004 | | |
| JP | 2005-035864 | * 2/2005 | ............ | C04B 35/581 |
| JP | 2005-035864 A | 2/2005 | | |
| JP | 2005-162950 A | 6/2005 | | |
| JP | 2010-195655 | * 9/2010 | ............. | C04B 35/16 |
| JP | A-2010-195655 | 9/2010 | | |

OTHER PUBLICATIONS

Office Action dated Oct. 22, 2014 from corresponding Chinese application and English translation.
Office Action dated Dec. 15, 2014 from corresponding Japanese patent application No. 2011-028031 (with attached English-language translation).

* cited by examiner

*Primary Examiner* — Bijan Ahvazi
(74) *Attorney, Agent, or Firm* — Drinker Biddle & Reath LLP

(57) ABSTRACT

An object of the present invention is to provide a light reflective substrate capable of achieving high optical reflectance even though fine particles are not used as a material, and a light emitting device using the same. The light reflective substrate according to the present invention comprises: a glass matrix; and $RNb_2O_6$ crystal and/or $R_4Nb_2O_9$ crystal (R is at least one of Mg, Ca, Sr and Ba) in the glass matrix.

7 Claims, No Drawings

LIGHT REFLECTIVE SUBSTRATE AND LIGHT EMITTING DEVICE USING THE SAME

TECHNICAL FIELD

The present invention relates to a light reflective substrate having high optical reflectivity and a light emitting device using the same.

BACKGROUND ART

LED and an organic EL device consume less electricity, and recently attract the attention as a new lighting device. In a device for lighting, a substrate and a package material, having high optical reflectance are required in order to effectively utilize light emitted from a luminous body. For example, alumina ceramic having relatively high optical reflectance, or a substrate having provided on the alumina ceramic an light reflective film comprising a metal has been used as the conventional package material of LED element. However, optical reflectance of a substrate and a package material is required to be further improved in order to obtain sufficient quantity of light as automotive lighting, display lighting and general lighting.

To achieve the above object, Patent Document 1 describes a light reflective substrate obtained by sintering a mixture of a glass powder and a ceramic powder, as a substrate having relatively high optical reflectivity. Specifically, the light reflective substrate described in Patent Document 1 comprises glass-ceramic containing a glass powder and a ceramic powder, wherein in a cross-section of the glass-ceramic, an area occupied by particles having a particle diameter of from 0.3 to 1 μm of the ceramic particles is from 10 to 70%. Thus, in Patent Document 1, high optical reflectivity is achieved by containing a large amount of ceramic particles having very fine particle size in the substrate.

CITATION LIST

Patent Document

Patent Document 1: JP-A-2007-121613

SUMMARY OF THE INVENTION

Problems to be Solved by the Invention

Light reflective substrate is obtained by, for example, forming a mixture of a glass powder and a ceramic powder into a slurry, forming the slurry into a green sheet, and firing the green sheet obtained. However, when a large amount of fine particles is contained in a substrate as in the light reflective substrate described in Patent Document 1, problems on production occur such that fluidity of the powder is deteriorated, and forming of a green sheet becomes difficult to be conducted.

The present invention has been made in view of the above circumstances, and has an object to provide a light reflective substrate capable of achieving high optical reflectance even though fine particles are not used as a material, and a light emitting device using the same.

Means for Solving the Problems

The present inventors found that high optical reflectance can easily be realized by containing specific crystals having high refractive index characteristics in a glass matrix, and proposes the finding as the present invention.

That is, the present invention relates a light reflective substrate comprising: a glass matrix; and $RNb_2O_6$ crystal and/or $R_4Nb_2O_9$ crystal (R is at least one of Mg, Ca, Sr and Ba) in the glass matrix.

Refractive index of $RNb_2O_6$ crystal and $R_4Nb_2O_9$ crystal is from 2.07 to 2.20, and those crystals have very high refractive index as compared with that of the other conventional oxide crystals. On the other hand, a refractive index of a glass generally used as a light reflective substrate is generally from 1.5 to 1.6, and therefore, refractive index difference between a glass phase and a crystal phase can be increased. As a result, light reflectance on a surface of a light reflective substrate can remarkably be improved.

Secondly, the light reflective substrate of the present invention is characterized that R is Ca.

Thirdly, the light reflective substrate of the present invention is characterized that the content of $RNb_2O_6$ crystal and/or $R_4Nb_2O_9$ crystal is 0.3% by mass or more.

Fourthly, the light reflective substrate of the present invention is characterized to comprise a sintered body of a mixed powder containing a glass powder and $RNb_2O_6$ crystal and/or $R_4Nb_2O_9$ crystal powders.

According to the constitution, a light reflective substrate wherein $RNb_2O_6$ crystal powder and/or $R_4Nb_2O_9$ crystal powder is uniformly dispersed in a glass matrix can easily be produced.

Fifthly, the light reflective substrate of the present invention is characterized to comprise a sintered body of a mixed powder containing a glass powder containing at least RO as a composition, and an $Nb_2O_5$ powder.

According to the constitution, a glass powder and an $Nb_2O_5$ powder are reacted to each other to crystallize $RNb_2O_6$ and/or $R_4Nb_2O_9$. As a result, light-absorbing defects are difficult to be formed in an interface between those crystals and the glass matrix. Therefore, light scattering can be enhanced, and as a result, optical reflectance can be enhanced.

Sixthly, the light reflective substrate of the present invention is characterized to further comprise at least one ceramic powder selected from alumina, quartz, zirconia, titanium oxide, forsterite, cordierite, mullite and zircon.

According to the constitution, mechanical strength of the light reflective substrate can further be improved.

Seventhly, the light reflective substrate of the present invention is characterized that the content of the ceramic powder is from 0.1 to 75% by mass.

Eighthly, the light reflective substrate of the present invention is characterized to have average optical reflectance at a wavelength of from 400 to 800 nm of 80% or more.

Ninthly, the present invention relates to a light emitting device using any one of the light reflective substrate described above.

Tenthly, the present invention relates to a light reflective substrate material, comprising a mixed powder containing a glass powder, and $RNb_2O_6$ crystal powder and/or $R_4Nb_2O_9$ crystal powder (R is at least one of Mg, Ca, Sr and Ba).

Eleventhly, the present invention relates to a light reflective substrate material, comprising a mixed powder containing a glass powder containing at least RO (R is at least one of Mg, Ca, Sr and Ba) as a composition, and $Nb_2O_5$ powder.

Twelfthly, the light reflective substrate material of the present invention is characterized that the R is Ca.

Thirteenthly, the present invention relates to a green sheet for a light reflective substrate, using any one of the light reflective substrate material above.

Mode for Carrying Out the Invention

The light reflective substrate according to the present invention comprises: a glass matrix; and $RNb_2O_6$ crystal and/or $R_4Nb_2O_9$ crystal (R is at least one of Mg, Ca, Sr and Ba) in the glass matrix.

It is preferable that total content of $RNb_2O_6$ crystal and $R_4Nb_2O_9$ crystal in the light reflective substrate is 0.3% by mass or more, 1.0% by mass or more, and particularly, 1.5% by mass or more. When the content of $RNb_2O_6$ crystal and $R_4Nb_2O_9$ crystal is less than 0.3% by mass, sufficient optical reflectance is difficult to be obtained. On the other hand, the upper limit is not particularly limited. However, excessively large content of $RNb_2O_6$ crystal and $R_4Nb_2O_9$ crystal is not preferred from the standpoint of production costs. Therefore, it is preferable that the content of $RNb_2O_6$ crystal and $R_4Nb_2O_9$ crystal is 30% by mass or less, 20% by mass or less, and particularly, 10% by mass or less.

Particle diameter of $RNb_2O_6$ crystal and $R_4Nb_2O_9$ crystal is not particularly limited. However, good optical reflectance can be obtained even at short wavelength in the vicinity of, for example, 400 nm with decreasing the particle diameter. On the other hand, an interface between the crystals and a glass matrix is decreased with increasing the crystal particle diameter, resulting in decrease in optical reflectance. From the standpoint of this, it is preferable that the crystal particle diameter is 10 μm or less, 5 μm or less, and particularly, 1 μm or less. As described before, in the case that the crystal particle diameter is small, fluidity of a powder is deteriorated, and green sheet forming tends to be difficult. Therefore, special attention is needed such that the crystal content is not excessive.

The light reflective substrate of the present invention can be produced by a method of sintering a material for a light reflective substrate, comprising a mixed powder containing $RNb_2O_6$ crystal powder and/or $R_4Nb_2O_9$ crystal powder synthesized by, for example, a solid phase reaction, and a glass powder (production method 1). According to the method, a light reflective substrate wherein the $RNb_2O_6$ crystal powder and/or the $R_4Nb_2O_9$ crystal powder is uniformly dispersed in the glass matrix can easily be produced.

Alternatively, the light reflective substrate of the present invention can be produced by a method of sintering a material for a light reflective substrate, comprising a mixed powder containing an RO-containing glass powder and $Nb_2O_5$ powder, and simultaneously crystallizing $RNb_2O_6$ and/or $R_4Nb_2O_9$ (production method 2). Particularly, according to the production method 2, a process of previously synthesizing $RNb_2O_6$ crystal powder and/or $R_4Nb_2O_9$ crystal powder can be omitted, leading to excellent mass productivity. Furthermore, in the production method 1, defects are liable to remain in the interface between the glass powder and the crystal powder. This becomes a factor of light absorption, and optical reflectance tends to be decreased. However, in the production method 2, light-absorbable defects are difficult to be formed in the interface between a glass matrix and crystal particles. Therefore light scattering can be enhanced, and as a result, optical reflectance can be enhanced.

Examples of the glass powder that can be used in the present invention include $SiO_2$—$B_2O_3$—$Al_2O_3$ glass, and $SiO_2$—$B_2O_3$—$R'_2O$ (R' is at least one of Li, Na and K) glass.

The $SiO_2$—$B_2O_3$—$Al_2O_3$ glass preferably contains, in terms of % by mass as a composition, from 30 to 70% of $SiO_2$, from 10 to 40% of RO(R is at least one of Mg, Ca, Sr and Ba), from 2 to 20% of $B_2O_3$, and from 2 to 20% of $Al_2O_3$.

The reason for limiting the glass composition as above is as follows.

$SiO_2$ is a component of increasing chemical durability. It is preferable that $SiO_2$ content is from 30 to 70%, from 40 to 70%, and particularly, from 45 to 60%. When the $SiO_2$ content is less than 30%, weatherability tends to be remarkably deteriorated. On the other hand, when the $SiO_2$ content is more than 70%, a glass tends to be difficult to melt.

RO is a component for decreasing a liquidus temperature of a glass and adjusting meltability. It is preferable that RO content is from 10 to 40%, from 10 to 30%, and particularly, from 15 to 30%, in total. When the RO content is less than 10%, a melting temperature is too high. On the other hand, when the RO content is more than 40%, devitrification is easy to occur.

Preferable range of the content of each component of RO is as follows. That is, it is preferable that CaO content is from 10 to 40%, from 10 to 30%, and particularly, from 15 to 30%. It is preferable that the content of each of MgO, SrO and BaO is from 10 to 40%, from 10 to 30%, and particularly, from 15 to 20%.

$B_2O_3$ is a component of improving meltability of a glass and decreasing a liquidus temperature. It is preferable that the $B_2O_3$ content is from 2 to 20%, from 2 to 15%, and particularly, from 4 to 13%. When the $B_2O_3$ content is less than 2%, not only meltability of a glass is deteriorated, but a liquidus temperature is increased, and as a result, devitrification easily occurs when forming a glass. On the other hand, when the $B_2O_3$ content is more than 20%, weatherability of a glass tends to be decreased.

$Al_2O_3$ is a component of improving meltability and weatherability of a glass. It is preferable that the $Al_2O_3$ content is from 2 to 20%, and particularly, from 2.5 to 18%. When the $Al_2O_3$ content is less than 2%, meltability of a glass is easily deteriorated. On the other hand, when the $Al_2O_3$ content is more than 20%, devitrification easily occurs.

The $SiO_2$—$B_2O_3$—$R'_2O$ (R' is at least one of Li, Na and K) glass preferably contains, in terms of % by mass as a composition, from 40 to 75% of $SiO_2$, from 10 to 30% of $B_2O_3$, and from 0.5 to 20% of $R'_2O$.

The reason for limiting the glass composition as above is as follows.

$SiO_2$ is a network former of a glass. It is preferable that the $SiO_2$ content is from 40 to 75%, and particularly, from 50 to 70%. When the $SiO_2$ content is less than 40%, vitrification is difficult to occur. On the other hand, when the $SiO_2$ content is more than 75%, a glass tends to be difficult to melt.

$B_2O_3$ is a component of improving meltability of a glass. It is preferable that the $B_2O_3$ content is from 10 to 30%, and particularly, from 15 to 25%. When the $B_2O_3$ content is less than 10%, a glass is difficult to melt. On the other hand, when the $B_2O_3$ content is more than 30%, weatherability tends to be decreased.

$R'_2O$ is a component of improving meltability of a glass. The $R'_2O$ content is from 0.5 to 20%, and preferably from 3 to 15%. When the $R'_2O$ content is less than 0.5%, meltability of a glass tends to be remarkably deteriorated. On the other hand, when the $R'_2O$ content is more than 20%, weatherability is easily decreased.

Any of the glass composition can contain $P_2O_5$, MgO, ZnO, $ZrO_2$, other oxide components, halide components, nitride components, and the like, other than the above components. Furthermore, the $SiO_2$—$B_2O_3$—$R'_2O$ glass can contain BaO and SrO. However, the total content of those other components is preferably limited to 20% or less.

Average particle diameter $D_{50}$ of the glass powder is not particularly limited. However, when the average particle diameter $D_{50}$ is too large, optical reflectance and mechanical strength of a light reflective substrate are easily decreased.

Therefore, the average particle diameter $D_{50}$ is preferably 15 μm or less, and particularly preferably 7 μm or less. On the other hand, when the average particle diameter $D_{50}$ is too small, production costs are increased. Therefore, the average particle diameter $D_{50}$ is preferably 0.5 μm or more, and particularly preferably 1.5 μm or more.

The light reflective substrate of the present invention can contain a ceramic powder as a filler in order to increase mechanical strength, other than $RNb_2O_6$ crystal and $R_4Nb_2O_9$ crystal. Examples of the ceramic powder include alumina, quartz, zirconia, titanium oxide, forsterite, cordierite, mullite and zircon. Those can be used alone or as mixtures of two kinds or more thereof.

It is preferable that the content of the ceramic powder in the light reflective substrate is from 0.1 to 75% by mass, from 2 to 75% by mass, and particularly, from 20 to 50% by mass. When the ceramic powder content is less than 0.1% by mass, an effect of increasing mechanical strength is difficult to achieve. On the other hand, when the ceramic powder content is more than 75% by mass, many pores are generated in the light reflective substrate, and mechanical strength is easy to be decreased.

The light reflective substrate of the present invention is produced by preforming a raw material powder containing a glass powder (material for light reflective substrate) into various forms such as a plate form, a sheet form and a block form, and then firing.

As the preforming method, various methods can be selected. Examples of the preforming method include a green sheet (tape) forming method, a slip casting method, a screen printing method, a mold pressing method, an aerosol deposition method, a spin coating method, and a die coating method.

The green sheet forming method is a method of adding a resin binder, a plasticizer and a solvent to a raw material powder, kneading the resulting mixture to prepare a slurry, and preparing a green sheet (tape) from the slurry using a sheet forming machine such as a doctor blade. This method is in widespread use as a method for producing a ceramic laminated circuit board. According to this method, in producing a ceramic laminated circuit board having optical reflective function by, for example, laminating a green sheet, it is easy to form a circuit in a board, to embed a metal material having high thermal conductivity by forming an electric via-hole, or to form a heat discharge passage by a thermal via-hole.

The screen printing method is a method of adding a resin binder and a solvent to an inorganic powder, kneading the resulting mixture to prepare a paste having a certain level of high viscosity, and forming a film on a surface of a substrate using a screen printing machine. According to this method, a light reflecting portion of a specific pattern can easily be formed on the surface of a substrate. Furthermore, a film having a desired thickness of from about several microns to about several hundred microns can be formed by adjusting viscosity of a paste, thickness of a screen, the number of printing, and the like.

It is preferable that average optical reflectance at a wavelength of from 400 to 800 nm of the light reflective substrate of the present invention is 80% or more, 85% or more, and particularly, 88% or more.

A light-permeable functional layer can be provided on a surface of the light reflective substrate of the present invention. For example, a protective coating against scratches, stain and chemical corrosion, and a functional layer having a function as a wavelength filter, optical diffusion or an interference layer can be further formed while maintaining optical reflective function on the surface of the light reflective substrate.

The functional layer is not particularly limited, and conventional materials such as glasses such as silicate glass; metal oxides such as silica, alumina, zirconia, tantalum oxide and niobium oxide; and resins such as polymethyl methacrylate, polycarbonate and polyacrylate can be used.

EXAMPLES

The present invention is described below by reference to Examples. However, the invention is not construed as being limited to those Examples.

Tables 1 and 2 show Examples and Comparative Examples.

TABLE 1

| | | Example | | | | Comparative Example | | |
|---|---|---|---|---|---|---|---|---|
| | | 1 | 2 | 3 | 4 | 1 | 2 | 3 |
| Glass powder composition (% by mass) | $SiO_2$ | 55 | 40 | 50 | 60 | 55 | 40 | 50 |
| | $Al_2O_3$ | 14 | | 10 | | 14 | | 10 |
| | $B_2O_3$ | 6 | 15 | 20 | 25 | 6 | 15 | 20 |
| | MgO | 2 | | | | 2 | | |
| | CaO | 23 | 30 | | | 23 | 30 | |
| | BaO | | 5 | | | | 5 | |
| | ZnO | | 3 | 5 | | | 3 | 5 |
| | $Li_2O$ | | 2 | | 6 | | 2 | |
| | $Na_2O$ | | 2 | 5 | 9 | | 2 | 5 |
| | $K_2O$ | | 3 | 5 | | | 3 | 5 |
| | $TiO_2$ | | | 2 | | | | 2 |
| | $ZrO_2$ | | | 2 | | | | 2 |
| | $P_2O_5$ | | | 1 | | | | 1 |
| Raw material powder composition (% by mass) | Glass powder | 68.4 | 96 | 57 | 61 | 70 | 75 | 60 |
| | $CaNb_2O_6$ | | | | 2 | | | |
| | $Ca_4Nb_2O_9$ | | | 3 | 2 | | | |
| | $Nb_2O_5$ | 1.6 | 4 | | | | | |
| | Alumina | 30 | | | | 30 | | |
| | Zirconia | | | 40 | | | | 40 |
| | Mullite | | | | 35 | | | |
| | Quartz | | | | | | 25 | |
| High refractive index crystal *( ) means content (% by mass) | | $CaNb_2O_6$ (2) | $CaNb_2O_6$ (5) | $Ca_4Nb_2O_9$ (3) | $CaNb_2O_6$ (2) $Ca_4Nb_2O_9$ (2) | None | None | None |
| Optical reflectance (%) | | 90 | 88 | 82 | 90 | 78 | 75 | 72 |

TABLE 1-continued

| | | Example | | | | Comparative Example | | |
|---|---|---|---|---|---|---|---|---|
| | | 1 | 2 | 3 | 4 | 1 | 2 | 3 |

TABLE 2

| | | Example | | | |
|---|---|---|---|---|---|
| | | 5 | 6 | 7 | 8 |
| Glass powder composition (% by mass) | $SiO_2$ | 50 | 50 | 55 | 58 |
| | $Al_2O_3$ | 14 | | 5 | 4 |
| | $B_2O_3$ | 11 | 10 | 15 | 25 |
| | MgO | 10 | | | |
| | CaO | 15 | 20 | | |
| | SrO | | 7 | | 4 |
| | BaO | | 6 | 10 | |
| | $Li_2O$ | | 2 | | 4 |
| | $Na_2O$ | | 2 | 5 | 5 |
| | $K_2O$ | | 3 | 5 | |
| | $TiO_2$ | | | 2 | |
| | $ZrO_2$ | | | 2 | |
| | $P_2O_5$ | | | 1 | |
| Raw material powder composition (% by mass) | Glass powder | 67 | 96 | 77 | 76 |
| | $CaNb_2O_6$ | | | | 2 |
| | $Ca_4Nb_2O_9$ | | | 3 | 2 |
| | $Nb_2O_5$ | 3 | 4 | | |
| | Alumina | 30 | | | |
| | Zirconia | | | | 20 |
| | Mullite | | | | |
| | Quartz | | | 20 | |
| High refractive index crystal *( ) means content (% by mass) | | $MgNb_2O_6$ (1) $CaNb_2O_6$ (2) | $CaNb_2O_6$ (2) $SrNb_2O_6$ (1) $BaNb_2O_6$ (1) | $Ca_4Nb_2O_9$ (3) $BaNb_2O_6$ (1) | $CaNb_2O_6$ (2) $Ca_4Nb_2O_9$ (2) $SrNb_2O_6$ (1) |
| Optical reflectivity (%) | | 91 | 89 | 85 | 91 |

Light reflective substrate of each of Examples and Comparative Examples was produced as follows. Raw materials were formulated so as to obtain glasses having compositions shown in Tables 1 and 2, and melted in an electric furnace kept at from 1,400 to 1,600° C. for 2 hours. The molten glass obtained was poured in water-cooled rollers to obtain a film-shaped glass. The glass film was pulverized with alumina ball mill to obtain a glass powder (average particle diameter $D_{50}=3$ μm).

Various inorganic powders were mixed with the glass powder in proportions shown in Tables 1 and 2. The resulting mixed powder was press molded with a mold having a diameter of 20 mm to prepare columnar pellets. The pellets were fired at 950° C. for 2 hours to obtain a light reflective substrate.

The content of $RNb_2O_6$ crystal and $R_4Nb_2O_9$ crystal in the light reflective substrate obtained was calculated based on peak intensity by powder X-ray diffraction.

Optical reflectance of the light reflective substrate obtained was measured. The results are shown in Tables 1 and 2. The optical reflectance was evaluated by average optical reflectance at a wavelength of from 400 to 800 nm measured by spectrophotometer.

As shown in Tables 1 and 2, the light reflective substrates of Examples 1 to 8 contain $RNb_2O_6$ crystal or $R_4Nb_2O_9$ crystal, having high refractive index, and therefore had high reflectance of 82% or more. On the other hand, the light reflective substrates of Comparative Examples 1 to 3 had low optical reflectance of from 72 to 78%.

Although the present invention has been described in detail and by reference to the specific embodiments, it is apparent to one skilled in the art that various changes or modifications can be made without departing the spirit and scope of the present invention.

This application is based on Japanese Patent Application No. 2010-041461 filed Feb. 26, 2010 and Japanese Patent Application No. 2011-28031 filed Feb. 14, 2011, the disclosures of which are incorporated herein by reference in their entities.

INDUSTRIAL APPLICABILITY

The light reflective substrate of the present invention has very high optical reflectance, and is therefore suitable for uses as a light reflective substrate used in displays such as LED package and organic EL, automotive lighting, general lighting and the like.

The invention claimed is:

1. A light reflective substrate comprising: a glass matrix; and $CaNb_2O_6$ crystal and/or $Ca_4Nb_2O_9$ crystal in the glass matrix, wherein the content of $CaNb_2O_6$ crystal and/or $Ca_4Nb_2O_9$ crystal is 0.3% by mass or more.

2. The light reflective substrate according to claim 1, comprising a sintered body of a mixed powder containing a glass powder and $CaNb_2O_6$ crystal and/or $Ca_4Nb_2O_9$ crystal powders.

3. The light reflective substrate according to claim 1, comprising a sintered body of a mixed powder containing a glass powder containing at least CaO as a composition, and an $Nb_2O_5$ powder.

4. The light reflective substrate according to claim 2 or 3, further comprising at least one ceramic powder selected from the group consisting of alumina, quartz, zirconia, titanium oxide, forsterite, cordierite, mullite and zircon.

5. The light reflective substrate according to claim 4, wherein the content of the ceramic powder is from 0.1 to 75% by mass.

6. The light reflective substrate according to claim 1, having average optical reflectance at a wavelength of from 400 to 800 nm of 80% or more.

7. A light emitting device using the light reflective substrate according to claim 1.

\* \* \* \* \*